United States Patent [19]

Radtke

[11] Patent Number: 4,611,481

[45] Date of Patent: Sep. 16, 1986

[54] METAL CONTAINER END DIE

[76] Inventor: Charles S. Radtke, 37 Beech St., Little Ferry, N.J. 07643

[21] Appl. No.: 803,154

[22] Filed: Dec. 2, 1985

[51] Int. Cl.[4] .......... B21D 45/00

[52] U.S. Cl. .......... 72/347; 413/8; 413/56; 72/354

[58] Field of Search .......... 72/347, 348, 379; 413/1, 8, 11, 56, 62

[56] References Cited

U.S. PATENT DOCUMENTS 3,768,295 10/1973 Cudzik .......... 413/56
4,031,837 6/1977 Jordan .......... 413/8
4,109,599 8/1978 Schultz .......... 413/8
4,372,720 2/1983 Herdzina .......... 413/8
4,559,801 12/1985 Smith .......... 72/348

*Primary Examiner*—Leon Gilden
*Attorney, Agent, or Firm*—Ronald G. Goebel

[57] ABSTRACT

A die for forming flanged can ends is provided according to the invention. The die includes an upper punch section including a hard ring having inner and outer rounded lower corners and a punch cut edge having an upwardly extending curvilinear female profile in the lower inner portion thereof which forms an annular gap between the punch cut edge and the hard ring.

A die section is disposed beneath the punch section comprising an inner die, a first upwardly biased draw ring mounted outwardly of the die and in inner contacting relationship with the punch cut edge. A second draw ring is mounted adjacent the inner die and in contacting relationship with the hard ring and a fixed wipe-up ring is located between the first and second draw rings. The upper portion of the wipe-up ring has a male profile matable with the female profile of the punch cut edge in the annular gap and has a downwardly curved inner portion which is matably engagable with the outer corner of said hard ring.

The burr formed in the outer corner of the blank after cutting in the die is disposed inwardly at the end of the stamping operation. Moreover, the die promotes the formation of uniform flange lengths.

5 Claims, 4 Drawing Figures

11 15 17 18 16 16b 16a 14 24 25 26 27a 27 13 23 23b 19 20 22 21 12

METAL CONTAINER END DIE

BACKGROUND OF THE INVENTION

This invention is concerned with a die and method for producing flanged metal container ends.

To achieve maximum material utilization at high manufacturing speed when producing flanged metal container ends, it is desirable and at times necessary to complete the end in a single stroke of a conventional single action type press. The accepted and widely used die design for this procedure involves a punch section and die section which blanks and forms the end in the upright position with a flange. In this upright position, the surface of the end that will become the outside of the container in is contact with the punch section of the tooling. After removal from the die, the container end is subjected to the secondary operations of segment curling and double seaming. In segment curling, the outside portion of the cut blank is curled inwardly. After placement on the container end the so-formed curled end is doubly folded inwardly by a double seaming operation to ensure a tight fit. When producing container ends in this manner two problems exist that are the result of the die configuration.

Firstly, a burr is formed on the outside corner of the cut surface of the blank which is undesirable since it has an adverse effect on the curling and seaming operations because of drag created as the burr moves through the tooling profiles used in curling and seaming.

Secondly, the uniformity of the flange length as it extends radially outward from the container end center is difficult to control due to the release of compressive pressure prior to the completion of the container end. The flange length sets the proper area of material necessary to produce the finished doubleseam when the end is affixed to the container body. It is well known that variations in flange length on container ends can result in leakage of the contained material in varying degrees.

The present invention, on the other hand, provides a unique die which when used in a conventional single action press, provides maximum material utilization while producing the container end in the inverted position leaving the blank cut edge burr on the inside corner of the cut surface. Further the die employs a draw ring in the die section which remains clamped to the flange area of the container end through the complete formation of the end thereby producing container ends having more uniform flange lengths.

SUMMARY OF THE INVENTION

The die of the present invention includes an upper punch section comprising a hard ring having inner and outer rounded lower corners and a punch cut edge having an upwardly extending curvilinear female profile in its lower inner portion forming an annular gap between the punch cut edge and the hard ring. Beneath the upper punch section is a lower die section comprising an inner die, a first upwardly biased draw ring mounted outwardly of the inner die and in contacting relationship with the punch cut edge. A second draw ring is mounted adjacent the inner die and in contacting relationship with the hard ring. A fixed wipe-up ring is located between the first and second draw rings, the upper portion of the wipe-up ring having a male profile matable with the female profile of the punch cut edge in the annular gap. The wipe-up ring also has a downwardly curved inner portion which is matably engagable with the outer corner of the hard ring. A die cut edge is mounted outwardly of the first draw ring to cut sheet material and form a blank.

To produce the flanged cut end, sheet material is placed between the upper punch section and lower die section of the die and cut by moving the punch section downwardly across the die cut edge whereby the sheet material is severed. A burred corner is formed on the outside of the cut blank. The punch section is continued downwardly to engage the die section whereby the outer portion of the blank is drawn inwardly from between the punch cut edge and first draw ring over the male profile and the downwardly curved inner portion of the wipe-up ring to a position against the side wall of the hard ring, the blank further forming a flange by compressive engagement with the hard ring and the second draw ring and the curved inner portion of the wipe-up ring.

At the end of the operation the burred corner is disposed inwardly instead of outwardly in the case of prior die designs. The hard ring remains in compressive contact with the blank against the second draw ring during the entire process to form a flange of uniform length. After conpletion of the process the so-formed flanged cut end is removed from the die.

DETAILED DESCRIPTION OF THE PREFERRED EMBODIMENTS

Figure 1:
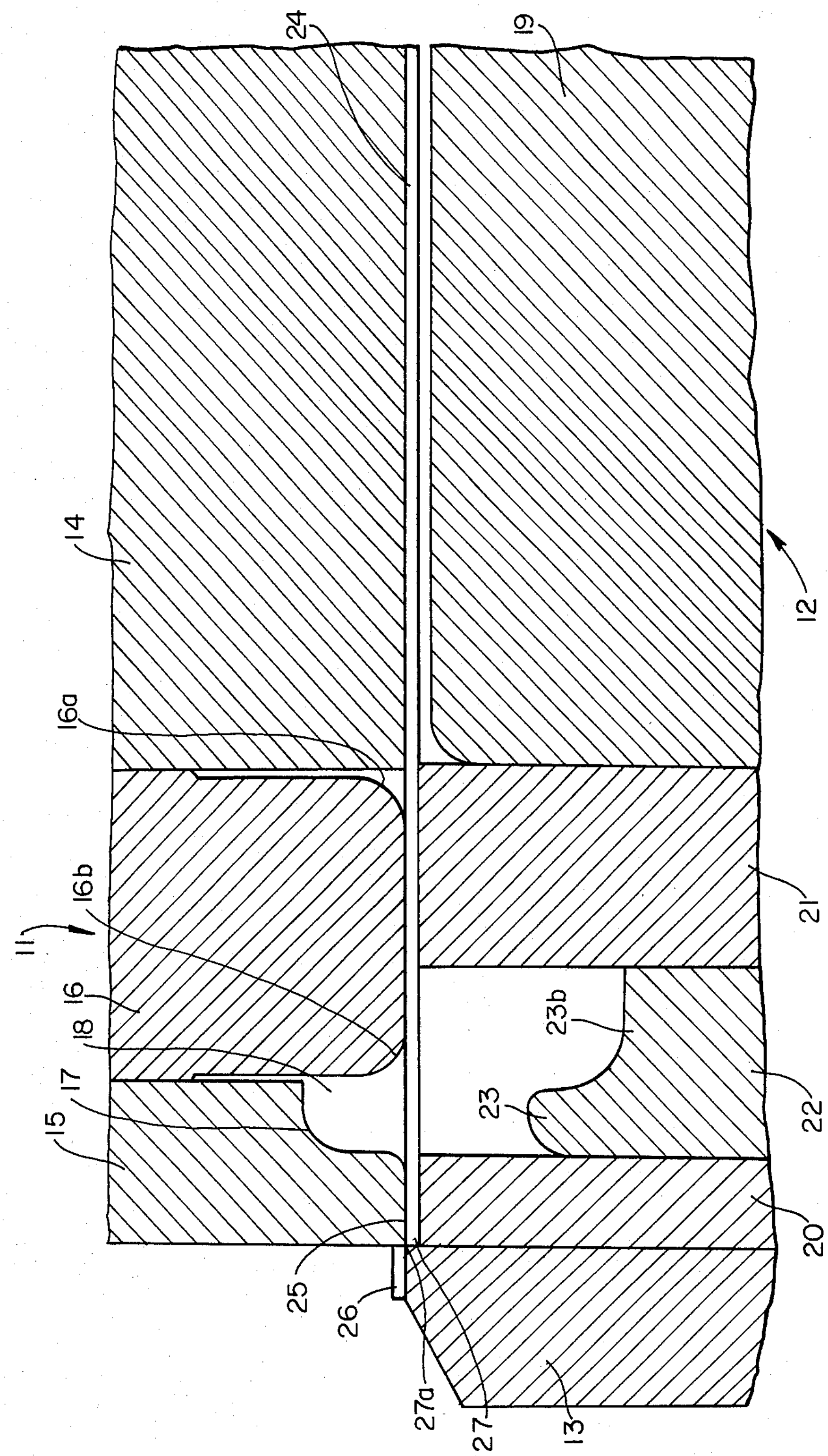
FIG. 1 is a sectional side view of the tool of the invention having inserted therein a piece of sheet material disposed between the punch and the sections.

Referring to the drawings there is shown a tool for forming flanged can ends according to the invention. Referring particularly to FIG. 1, the tool consists of a die comprising an upper punch section shown generally by 11 and a lower die section shown generally by 12, the upper and lower sections being concentric and cooperating to move axially along the axis of the tool. A fixed female die cut edge 13 is annularly disposed about the tool for cutting stock material inserted between the punch and die sections. Located inwardly of the punch section 11 is knock-out 14 resiliently-biased upwardly which acts to remove the finished can end from the tool. The punch section 11 consists of a punch cut edge 15 and hard ring or ram 16 which move together downwardly. The punch cut edge 15 has an inwardly disposed curved female profile 17 at the lower portion thereof forming annular groove 18 between the bottom of the punch cut edge and the hard ring 16. This groove has a curvilinear outside boundary formed by female profile 17 of the punch cut edge and the rounded outside corner **16*b* of hard ring 16. The inner corner 16*a*** of the hard ring is also curved.

The lower die section 12 consists of an inner panel die 19 which is stationery. Outwardly of this die adjacent the die cut edge 13 is a first draw ring 20 which is resiliently biased upwardly and adjacent the panel die 19 is second draw ring 21 which is also resiliently biased upwardly. Located between the first and second draw rings is fixed wipe-up ring 22. The wipe-up ring has a curvilinear male profile 23 which is complementary to the female profile 17 of the punch cut edge 15. Additionally, the downwardly extending curvilinear portion 23*b* of the wipe-up ring is complementary to the curved lower corner 16*b* of the hard ring. The punch cut edge and hard ring when moved downwardly to engage the wipe-up ring as in FIG. 4 will provide a mating relationship between the male profile of the wipe-up ring and the female profile of the punch cut edge and the lower corner of the hard ring and the downwardly extending curvilinear portion of the wipe-up ring.

FIG. 1 shows a piece of sheet material 24 disposed between the punch and die sections. To arrive at this confuguration, the material is fed into the open die (not shown) wherein the punch and die sections are spaced apart. The material is a flat metallic sheet which is cut to form a blank 25 by the punch cut edge 15 moving slightly downwardly through the die cut edge 13. The excess piece of sheet material is shown by 26. The blank is contemplated for use as an end closure for a cylindrical container. The cut end 27 of the blank is burred at corner 27*a* by virtue of the cut.

Figure 2:
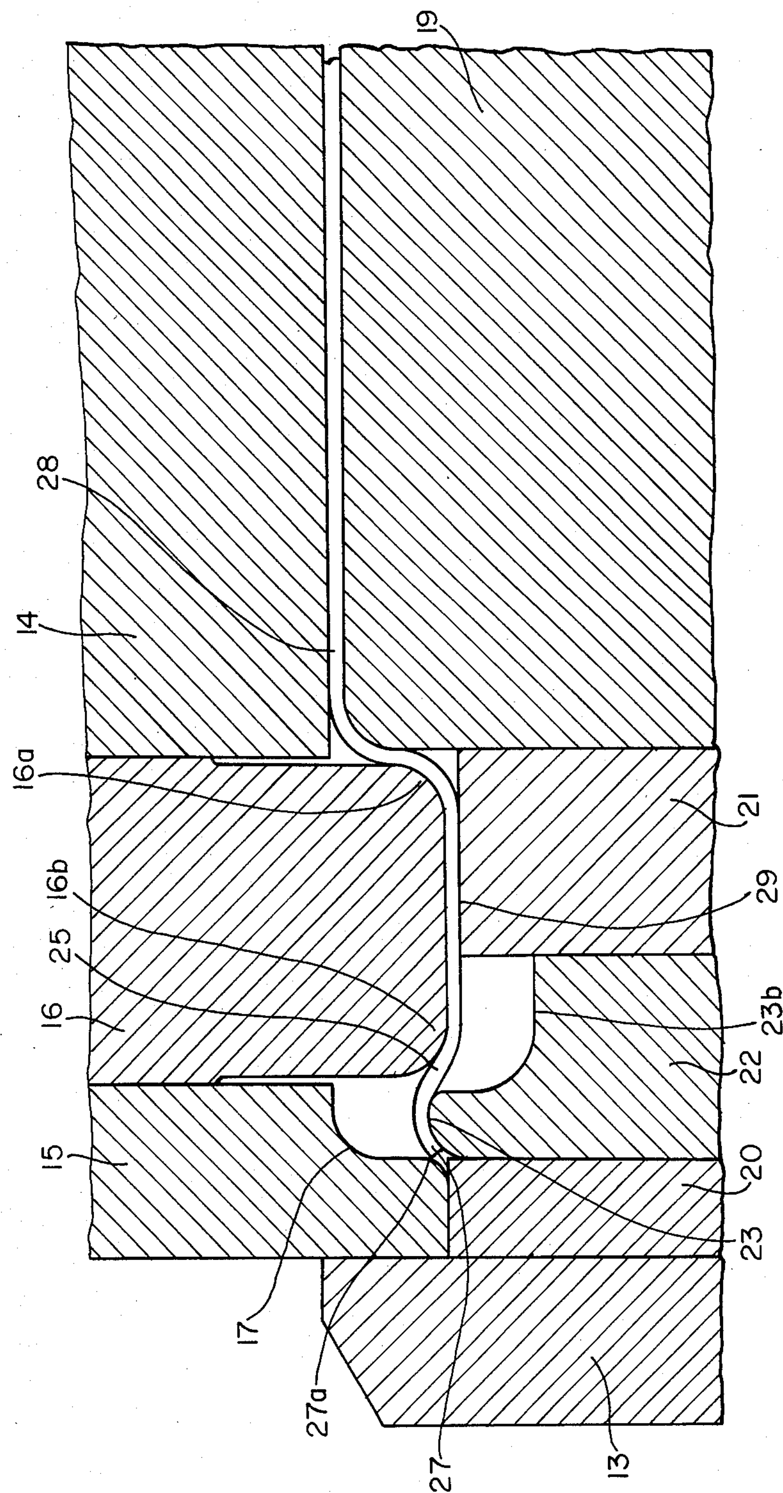
FIG. 2 is a further sectional side view of the tool with the punch cut edge and hard ring of the tool moved partially downward.

In FIG. 2 the punch cut edge 15 and hard ring 16 have moved downwardly together below the die 19, the upwardly biased first draw ring 20 and second draw ring 21 being also moved downwardly in response thereto. A panel 28 begins to form in the blank 25 between the knock-out 14 and the die 19. The inner corner 16*a* of hard ring 16 has begun to deform the outer section of the blank against the die 19 to a downwardly curved flange portion 29. At the same time, the outer portion of the blank has become inwardly drawn from between the punch cut edge 15 and first draw ring 20 by the male profile 23 of the wipe-up ring 22.

Figure 3:
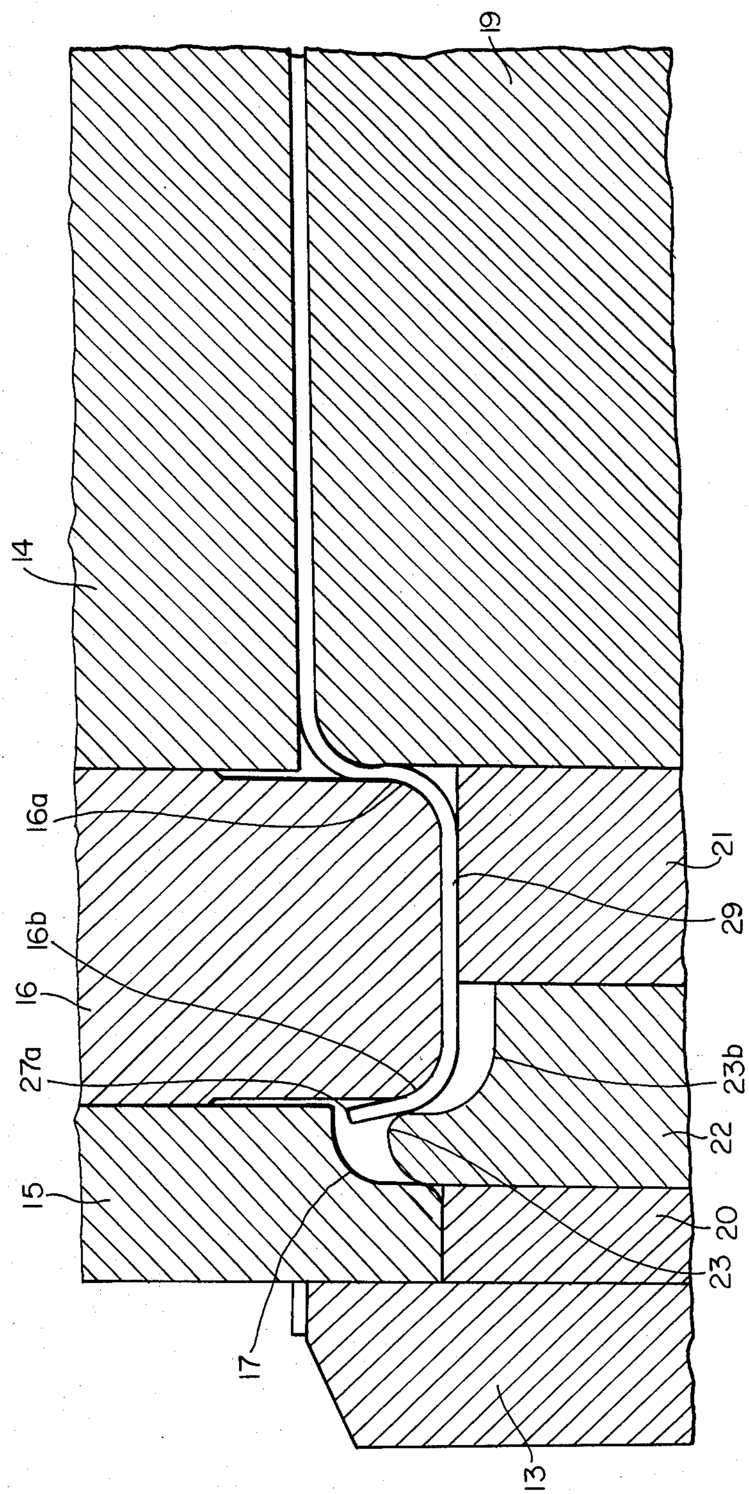
FIG. 3 is a further sectional side view of the tool with the punch cut edge and hard ring moved further downwardly.

In FIG. 3, the hard ring 16 and punch cut edge 15 have moved further downward deepening the flange 28. More importantly however, the outer end of the blank has moved over the top of the male profile 23 of the wipe-up ring and is being deformed downwardly towards loser section 23*b* and is folded toward the outer side wall of the hard ring 16.

Figure 4:
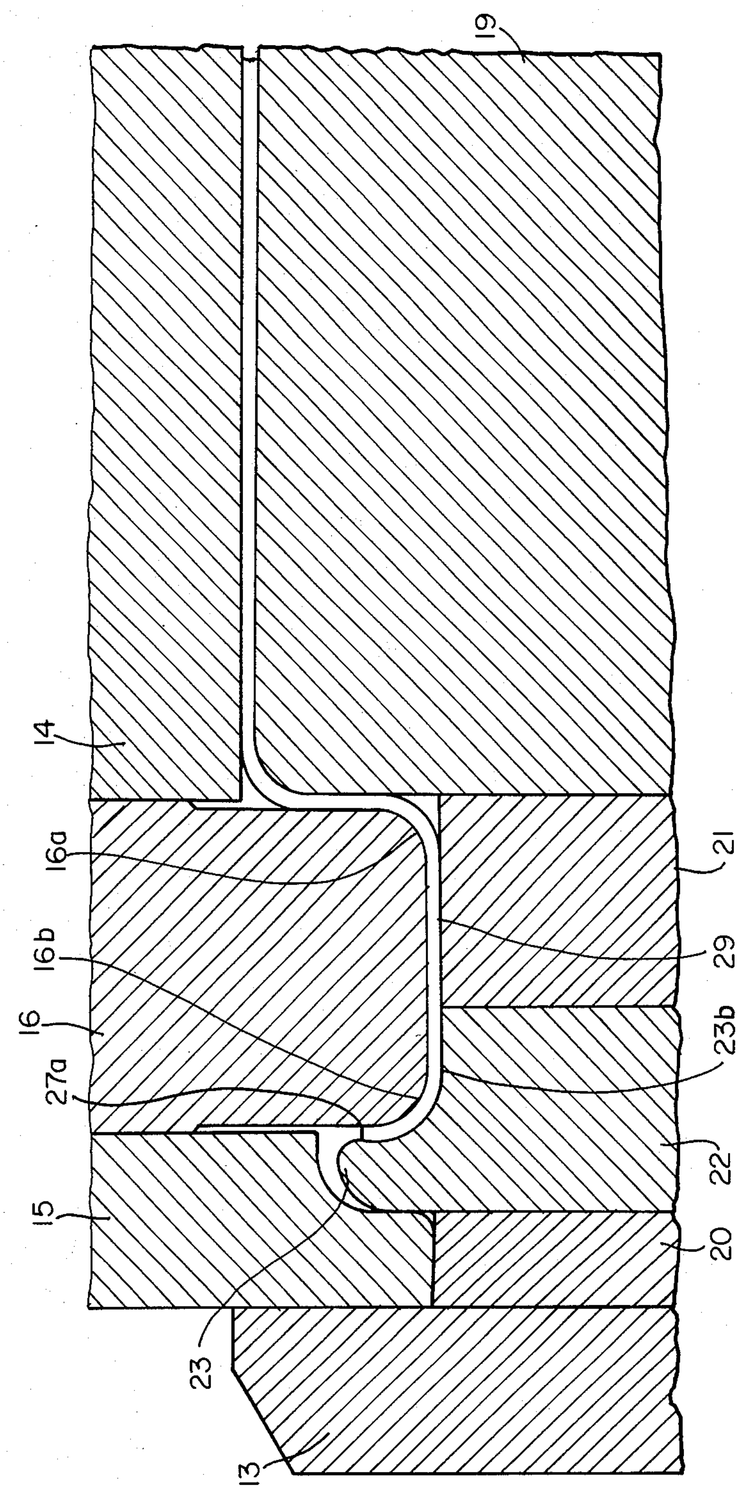
FIG. 4 is further sectional side view of the tool with the punch cut edge and hard ring in mating relationship

In FIG. 4 the hard ring and punch cut edge approach a mating relationship, that is the male profile 23 and lower curved section of the wipe-up ring 23*b* and the female profile 17 of the punch cut edge and rounded outer corner 16*b* of the hard ring are in complementary and compressive contact with the blank. The flange 29 is even more deeply formed. However, mose importantly the outer end of the blank is compressed against the outer side wall of the hard ring 16 and the burr 27*a* is disposed inwardly. After completion the punch section is withdrawn and the upwardly biased first and second draw rings move the finished can end upwardly against the knock-out whereafter it is removed by standard techniques. By having the burr disposed inwardly there is no adverse effect on the secondary operations of segment curling and double seaming which represents enormous cost savings to the manufacturers of such ends.

Moreover, the tool of the invention provides a uniform flange length because the blank remains clamped between the hard ring and the second draw ring during the entire stamping operation. If such clamping did not take place, as for example, in prior die designs in which only a single outer draw ring is employed, a uniform flange length would not result because the only control of the uniform reduction of the blank outer diameter as the can end blank is drawn would come from extremely accurate tolerances in the die components themselves. As the die continuously runs and wear of components becomes non-uniform the draw of the blank would no longer be uniform in all directions from the center of the blank resulting in uneven flange lengths. By clamping the blank between the hard ring and second draw ring throughout the stamping operation consistent control of the reduction of the blank outer diameter is achieved. Since the flange length sets the proper area of material necessary to produce the finished double seam when the end is affixed to the container body, uniform flange lengths in can ends as produced according to the invention prevent leakage of the contained material.

I claim:

1. A die for producing a container end from sheet material comprising:

(a) an upper punch section comprising a hard ring having inner and outer rounded lower corners and a punch cut edge having an upwardly extending curvilinear female profile in the lower inner portion thereof forming an annular gap between said punch cut edge and said hard ring; and (b) a lower die section comprising an inner die, a first upwardly biased draw ring movably mounted outwardly of said die and in contacting relationship with said punch cut edge; a second draw ring mounted adjacent said inner die and in contacting relationship with said hard ring; and a fixed wipe-up ring located between said first and second draw rings, the upper portion of said wipe-up ring having a male profile matable with said female profile of said punch cut edge in said annular gap and having a downwardly curved inner portion which is matably engagable with said outer corner of said hard ring.

2. The die of claim 1 which further comprises a die cut edge mounted outwardly at said first draw ring.

3. The die of claim 1 which further comprises an upwardly biased knock-out mounted over said inner die.

4. A method of producing a flanged container end from sheet material comprising:

(a) placing said sheet material between the upper punch section and lower die section of a die wherein said upper punch section comprises:

(i) a hard ring having inner and outer rounded lower corners and a punch cut edge having an upwardly extending curvilinear female profile in the lower inner portion thereof forming an annular gap between said punch cut edge and said hard ring and said lower die section comprises:

(ii) an inner die, a first upwardly biased draw ring movably mounted outwardly of said inner die and in contacting relationship with said punch cut edge; a second draw ring mounted adjacent said inner die and in contacting relationship with said hard ring; and a fixed wipe-up ring located between said first and second draw rings, the upper portion of said wipe-up ring having a male profile matable with said female profile in said punch cut edge in said annular gap and having a downwardly curved inner portion which is matably engagable with said outer corner of said hard ring; and (iii) means for cutting said sheet material;

(b) cutting said sheet material to form a blank;

(c) moving said punch section to engage said die section whereby the outer portion of said blank is drawn inwardly over said male profile and said downwardly curved inner portion of said wipe-up ring to a position against the side wall of said hard ring, said blank further forming a flange by compressive engagement with said hard ring and said second draw ring and the curved inner portion of said wipe-up ring; and (d) removing a flanged can end from said die.

5. The method of claim 4 which further comprises an upwardly biased knock-out mounted above said inner die.

* * * * *